Patented May 3, 1938

2,116,196

UNITED STATES PATENT OFFICE 2,116,196

ACYLATED PHTHALOCYANINES

Sebastian Gassner and Berthold Bienert, Leverkusen I. G.-Werk, Germany, assignors to General Aniline Works, Inc., New York, N. Y., a corporation of Delaware No Drawing. Application December 14, 1936, Serial No. 115,820. In Germany December 17, 1935

9 Claims. (Cl. 260—12)

The present invention relates to new pigments of the phthalocyanine series.

Phthalocyanines represent a new class of pigment dyestuffs which can be prepared in various ways, for instance, by heating an ortho-dihalogen-benzene or an ortho-halogen-nitrile of the benzene series with cuprous cyanide or by heating ortho-dinitriles of the benzene series with copper or copper salts. The compounds which are obtainable according to the said processes are characterized by having chemically combined copper. In a similar manner phthalocyanines containing other polyvalent metals than copper can be prepared. Also metalfree phthalocyanines have been prepared either by removing from the phthalocyanines those metals which are relatively loosely bound, such as magnesium, or by heating ortho-dinitriles of the benzene series with an alkalimetal alcoholate followed by a hydrolysis of the alkalimetal compound thus formed. Phthalocyanines which are derived from ortho-dihalogenbenzenes, ortho-nitrilohalogenobenzenes or phthalodinitrile are for brevity's sake in the following designated as "phthalocyanines of the benzene series".

Most of the hitherto known phthalocyanines show clear blue shades and part of them are characterized by their excellent fastness properties. As far as within the phthalocyanine series products of green coloration have been obtained, they are either relatively dull in shades or show insufficient fastness properties.

It is the object of the present invention to prepare phthalocyanines which combine a clear greenish shade with the fastness properties of, for instance, a copper phthalocyanine of the benzene series. Other objects of the present invention will be apparent from the following description and claims:

We have found that the presence of acyl groups in the benzene nuclei effects that the shades turn from blue to greenish-blue or green. In accordance therewith our invention is concerned with phthalocyanines of the benzene series containing acyl groups in the benzene nuclei. As follows from the above, all compounds of the character described are within the scope of our invention, regardless as to whether they have been prepared by a process starting from ortho-dihalogenbenzenes or from ortho-dinitriles of the benzene series wherein the benzene nuclei contain acyl groups, or whether these compounds have been prepared in any other way.

The new phthalocyanines which are characterized by the presence of acyl groups in the benzene nuclei can be prepared in the following manner: As starting materials ortho-dinitriles of the benzene series are used which have as substituent an acyl group, for instance, an acetyl, butyryl, propionyl, benzoyl, methylbenzoyl, halogenbenzoyl, methoxybenzoyl, diphenoyl, naphthoyl, substituted naphthoyl group or by the acyl group of a higher aromatic carboxylic acid. At any rate, radicals of aromatic acids are preferred. We can also start from those compounds of the benzene series which contain such an acyl group and which are capable of being transformed intermediately into ortho-dinitriles in the course of the reaction, as ortho-halogennitriles and ortho-dihalogenbenzenes. The transformation of these starting materials into phthalocyanines takes place in the usual ways, for instance, by heating the ortho-dinitriles with metals or metal yielding agents, such as copper, nickel, iron, tin, cobalt or the salts thereof, if necessary, in the presence of a suitable solvent such as pyridine, quinoline or benzophenone, the special working conditions being stated in the following examples. In case of working in the presence of tertiary organic bases such as pyridine or quinoline the new phthalocyanines are mostly obtained in form of intensively greenish colored addition products which are soluble in some organic solvents and are split up by an acid treatment. Also metal-free phthalocyanines are embraced within the scope of our claims. These compounds can be prepared, for instance, by heating the respective starting materials with sodium amylate followed by a hydrolysis by means of sulfuric acid.

The acylphthalocyanines obtained by the said processes show greenish-blue to green shades. Owing to their fastness to light, water and spirit they represent excellent pigment dyestuffs, for instance, for graphic wall-paper printing and for the coloring of artificial silk. At any rate, prior to use, the phthalocyanines are preferably pasted from concentrated sulfuric acid by dissolution followed by precipitation in water. In order to effect a finer distribution and to reduce the hardness of grains they can, furthermore, be subjected to a treatment with dispersing agents or wetting agents in the presence of water. If necessary, the dyestuffs can be sulfonated by the action of fuming sulfuric acid. These sulfonic acids can be employed for the dyeing of textiles or for the preparation of new color lakes, for instance, by transformation into their earthalkali metal salts. Most of the new phthalocyanines as well as the sulfonic acids thereof are capable of being vatted, the vat showing mostly a bluish-red coloration.

The following examples illustrate the invention without, however, restricting it thereto, the parts being by weight:—

Example 1

49.5 parts of 3.4-dicyanobenzophenone are added to a solution of 2.5 parts of sodium in 300 parts of amylalcohol. On heating the whole mixture to boiling for 1–2 hours the separating dyestuff is sucked off and rinsed by extracting it with ethylalcohol. The clear bluish-green pigment dyestuff thus obtained is soluble in concentrated sulfuric acid with a green coloration and can be separated in a finely dispersed state by pouring it into water.

The 4-benzoyl-phthalonitrile (3.4-dicyanobenzophenone) serving as starting material can be obtained from 4-amino-benzophenone by sulfonation (for example in nitrobenzene with chlorsulfonic acid), diazotation of the amino group and substitution of the diazo group by the cyanogen group by treatment with potassium cuprous cyanide and substitution of the sulfo group by subliming the sodium salt with anhydrous potassium ferrocyanide in vacuo. By recrystallization of the sublimate it is obtained in the form of leafy crystals of melting point 130° C.

Example 2

6 parts of 3.4-dicyanobenzophenone and 24 parts of cuprous chloride are intimately mixed and heated to 200–210° C. for ¼ to ½ hour. The reaction product is reduced to small pieces, boiled up with 10% hydrochloric acid and extracted with alcohol in a hot extractor. A bronze powder is thus obtained which in a finely divided form constitutes a clear greenish-blue pigment dyestuff of excellent fastness to light.

On using nickel chloride, cobalt chloride, tin chloride or ferrous chloride instead of cuprous chloride, it is of advantage to work in the presence of quinoline. The dyestuffs thus obtained generally exhibit a more greenish tint than those obtained with the application of cuprous chloride.

Example 3

A mixture of

| | Parts |
|---|---|
| Nitrobenzene | 420 |
| 4-chloro-3′.4′-dicyanobenzophenone (F. P. 175–178°) which is obtained by subliming the sodium salt of 4-chloro-4′-cyano-benzophenone-3′-sulfonic acid with potassium ferrocyanide | 35 |
| Pyridine | 3.5 |
| Cuprous chloride | 8.5 | is heated for 3 hours while stirring to 180° C. On removing the nitrobenzene by means of vapor the residue is rinsed by boiling with hydrochloric acid and sodium lye. A very clear, greenish-blue pigment dyestuff is thus obtained which is soluble in concentrated sulfuric acid monohydrate with a green coloration.

The corresponding metal-free dyestuff shows somewhat more greenish shades.

Example 4

An intimate mixture of

| | Parts |
|---|---|
| 4-methyl-3′.4′-dicyanobenzophenone (F. P. 182–184°) which is obtained by subliming the sodium salt of 4-methyl-4′-cyanobenzophenone-3′-sulfonic acid with potassium ferrocyanide | 1 |
| Cuprous chloride | 0.5 |
| Anhydrous sodium sulfate | 4 | is heated for ½–1 hour to 200–210° C. On pulverizing the reaction product the dyestuff thus obtained is isolated by boiling it with hydrochloric acid and dilute sodium lye. It is soluble in concentrated sulfuric acid with a green coloration and shows a similar shade to the dyestuff described in Example 3.

The corresponding metal-free dyestuff shows somewhat more greenish shades.

Example 5

When working according to the directions given in Example 4 with the exception that the 4-methyl-3′.4′-dicyanobenzophenone is replaced by the 4-phenyl-3′.4′-dicyanobenzophenone there is obtained a dyestuff of similar properties. It differs from the dyestuff described in Example 4 in that it dissolves in sulfuric acid monohydrate with a yellowish-brown coloration, sulfonation occurring thereby in the phenyl radicals.

The corresponding metal-free dyestuff shows somewhat more greenish shades.

The 4-phenyl-3′.4′-dicyanobenzophenone serving as starting material is prepared in a manner quite analogous as described in the preceding examples. It shows a melting point of 170–172°.

Example 6

When working according to the directions given in Example 4 with the exception that the 4-methyl-3′.4′-dicyanobenzophenone is replaced by the 3.4-dicyanophenyl-alpha-naphthylketone there is obtained a dyestuff of similar properties. It dissolves in concentrated sulfuric acid with a yellowish-brown coloration. It can be precipitated therefrom in a finely dispersed state by pouring the solution into water. The new compound represents a very clear bluish-green pigment dyestuff.

The corresponding metal-free dyestuff shows somewhat more greenish shades.

The 3.4-dicyanophenyl-alpha-naphthylketone serving as starting material is prepared in the usual manner from the sodium salt of 4-cyano-alpha-naphthophenone-3-sulfuric acid and has a melting point of 163–165°.

Example 7

When working according to the directions given in Example 4 with the exception that the 4-methyl-3′.4′-dicyanobenzophenone is replaced by the 3.4-dicyanophenyl-beta-naphthylketone there is obtained a dyestuff of similar properties. It shows a somewhat more yellowish coloration than the dyestuff according to the foregoing example.

The 3.4-dicyanophenyl-beta-naphthylketone serving as starting material is prepared in the usual manner from the sodium salt of 4-cyano-beta-naphthophenone-3-sulfuric acid and has a melting point of 182–184°.

We claim:—

1. As a new product a phthalocyanine of the benzene series containing acyl groups attached to the benzene nuclei.

2. As a new product a copper phthalocyanine of the benzene series containing acyl groups attached to the benzene nuclei.

3. As a new product a phthalocyanine of the benzene series containing acyl groups of the aromatic series attached to the benzene nuclei.

4. As a new product a phthalocyanine of the benzene series containing benzoyl groups attached to the benzene nuclei.

5. As a new product a copper phthalocyanine of the benzene series containing acyl groups of the aromatic series attached to the benzene nuclei.

6. As a new product a copper phthalocyanine of the benzene series containing benzoyl groups attached to the benzene nuclei.

7. As a new product a metal-free phthalocyanine of the benzene series containing acyl groups attached to the benzene nuclei.

8. As a new product a metal-free phthalocyanine of the benzene series containing acyl groups of the aromatic series attached to the benzene nuclei.

9. As a new product a metal-free phthalocyanine of the benzene series containing benzoyl groups attached to the benzene nuclei.

SEBASTIAN GASSNER.
BERTHOLD BIENERT.